US008904489B2

(12) United States Patent
Varghese

(10) Patent No.: US 8,904,489 B2
(45) Date of Patent: Dec. 2, 2014

(54) CLIENT IDENTIFICATION SYSTEM USING VIDEO CONFERENCING TECHNOLOGY

(76) Inventor: Thomas Varghese, San Mateo, CA (US)

( * ) Notice: Subject to any disclaimer, the term of this patent is extended or adjusted under 35 U.S.C. 154(b) by 172 days.

(21) Appl. No.: 12/877,962

(22) Filed: Sep. 8, 2010

(65) Prior Publication Data

US 2011/0072500 A1 Mar. 24, 2011

Related U.S. Application Data

(60) Provisional application No. 61/240,592, filed on Sep. 8, 2009.

(51) Int. Cl.
*H04L 29/06* (2006.01)
*G06F 21/32* (2013.01)

(52) U.S. Cl.
CPC .................................. *G06F 21/32* (2013.01)
USPC ................ 726/4; 726/1; 726/2; 726/3; 726/5; 726/7; 726/21; 726/26; 726/27; 726/28; 726/29; 726/30; 713/168; 713/170; 713/182; 713/186; 709/219; 709/225; 709/229; 379/88.01; 379/88.02

(58) Field of Classification Search
CPC ..... G06F 21/03; G06F 2211/003; H04L 9/32; H04L 29/067; H04L 29/12245; H04L 61/203; H04L 63/08; H04L 2463/082
USPC ........ 726/1–10, 16–21, 26–30; 713/168–186; 379/88.01–88.04; 709/217–229
See application file for complete search history.

(56) References Cited

U.S. PATENT DOCUMENTS

| | | | |
|---|---|---|---|
| 7,676,026 B1 * | 3/2010 | Baxter, Jr. ................... | 379/88.01 |
| 2002/0046139 A1 * | 4/2002 | Ozaki et al. ...................... | 705/27 |
| 2005/0138391 A1 * | 6/2005 | Mandalia et al. .............. | 713/186 |
| 2006/0101508 A1 * | 5/2006 | Taylor ............................... | 726/7 |
| 2006/0245576 A1 * | 11/2006 | Henry ....................... | 379/265.01 |
| 2006/0248005 A1 * | 11/2006 | Moore ............................ | 705/39 |
| 2007/0094497 A1 * | 4/2007 | O'Gorman et al. ........... | 713/168 |
| 2009/0037983 A1 * | 2/2009 | Chiruvolu et al. ................ | 726/4 |
| 2009/0305670 A1 * | 12/2009 | DeBoer et al. ................. | 455/411 |
| 2010/0229230 A1 * | 9/2010 | Edeki et al. ........................ | 726/7 |

OTHER PUBLICATIONS

It's Not What You Know, But Who You Know A social approach to last-resort authentication by Schechter et al; Publisher: ACM; Date: Apr. 9, 2009.*

* cited by examiner

*Primary Examiner* — Madhuri Herzog
(74) *Attorney, Agent, or Firm* — Ellahie & Farooqui LLP; Omair M. Farooqui

(57) ABSTRACT

A system and process for identifying a client, comprising a client device having a video camera and a voice transmitting and receiving device capable of transmitting a client's image and voice via a communication carrier system and a communications network to a user terminal, whereby the user terminal permits an authentication of the client's image and voice in real time. Another aspect of the present invention includes a method of identifying a fraudster, comprising the steps of using a client device having a video camera and voice transmitting and receiving device to initiate an authentication of a client's identity, transmitting the fraudster's image and voice over a communication carrier system and a communications network to a user terminal, comparing the fraudster's image and voice to client data, and storing the fraudster data.

20 Claims, 3 Drawing Sheets

CLIENT IDENTIFICATION SYSTEM USING VIDEO CONFERENCING TECHNOLOGY

RELATED APPLICATION

This application claims priority to and the benefit of U.S. Provisional Patent Application Ser. No. 61/240,592, filed on Sep. 8, 2009, titled, "Client Identification System Using Video Conferencing Technology," under 35 U.S.C. §119(e)(1), which is hereby incorporated by reference in its entirety for all purposes.

FIELD OF THE INVENTION

The present invention relates generally to the field of authentication and security systems. The present invention also relates to a method and an apparatus for a client identification system using video conferencing technology. The present invention can be applied to any industry that uses authentication systems.

BACKGROUND OF THE INVENTION

A number of financial and non-financial institutions have implemented various "online financial transaction" capabilities. Most such services require clients to register a debit/credit card or bank account before sending or receiving funds. As an example, recipients of payments may receive email notifications with a specially coded link to register and authenticate before receiving several payment options, such as depositing or withdrawing funds into a bank or credit card account.

However, authentication in a communication network normally includes confirming a client attempting to access a system or a network. The authentication process is the most basic and essential process of protecting principal assets. Currently, there are three authentication schemes which are primarily used in a communication network.

A first authentication scheme is to confirm something you know, a second authentication scheme is to confirm something you have, and a third authentication scheme is to confirm you yourself. Among the three authentication schemes, the authentication scheme of confirming something the client knows, e.g., a log-on password, is most widely used on computer networks. In this scheme, when a client-input password is correct, the client is authorized. However, in the scheme of confirming the log-on password, a password may be stolen or robbed, exposed due to carelessness, or lost. Furthermore, many users or clients are suffering from password fatigue, and many are looking to simplify the manner in which day-to-day transactions and activities are conducted, including transactions for larger funds. To solve this problem, a more powerful authentication scheme is necessary.

As more powerful authentication, Two-Factor Authentication using a combination of two of the three methods, as mentioned earlier, has been proposed. The two-factor authentication is widely used for applications necessitating powerful client authentication. The two-factor authentication is commonly based on both 'Something you know' and 'Something you have'. Representative examples of the two-factor authentication include a credit card, a cash card, and Internet banking service. The card itself is what a client has physically ("What you have"), and a password corresponding to this card is what the client knows ("What you know"). The two factors are required for successful authentication.

The two-factor authentication greatly reduces losses or damage due to on-line fraudulent use of an ID. This is because one cannot access desired information or system through fraudulent use of a password without holding a card. Accordingly, the two-factor authentication provides much higher security than typical single factor authentication schemes.

However, there are some constraints obstructing spreading of the two-factor authentication. That is, clients tend to dislike carrying something new. Furthermore, enterprises have adopted different two-factor authentications, resulting in low compatibility. Further, the information contained in either three authentication schemes contain static information, that is information that can be "hijacked" if the client's identity is stolen via malicious software and hacking techniques designed to infiltrate personal accounts and personal information. Thus, an authentication scheme capable of providing both powerful security and client-friendliness is urgently needed.

With the recent rapid development of communication network technology, and where rapid acquisition of a substantial amount of information is of importance, and where clients are exponentially more mobile and not bound to a single office in a specific city, clients are demanding advanced solutions utilizing multimedia information including sound, image, and moving picture, in addition to existing telephone and data transmission service, more suited to their needs. Video conference as a representative application using multimedia transmission service has been studied, and developed and implemented in a variety of environments.

SUMMARY OF THE INVENTION

An aspect of the present invent includes a system for identifying a client, comprising a client device having a video camera and a voice transmitting and receiving device capable of transmitting a client's image and voice via a communication carrier system and a communications network to a user terminal, whereby the user terminal permits an authentication of the client's image and voice in real time.

Another aspect of the present invention includes a method of identifying a client, comprising the steps of using a client device having a video camera and voice transmitting and receiving device to initiate an authentication of a client's identity, transmitting a client's image and voice over a communication carrier system and a communications network to a user terminal, and authenticating the client's image and voice in real time.

Another aspect of the present invention includes a method of identifying a fraudster, comprising the steps of using a client device having a video camera and voice transmitting and receiving device to initiate an authentication of a client's identity, transmitting the fraudster's image and voice over a communication carrier system and a communications network to a user terminal, comparing the fraudster's image and voice to client data, and storing the fraudster data.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

DETAILED DESCRIPTION OF THE INVENTION

Figure 1:
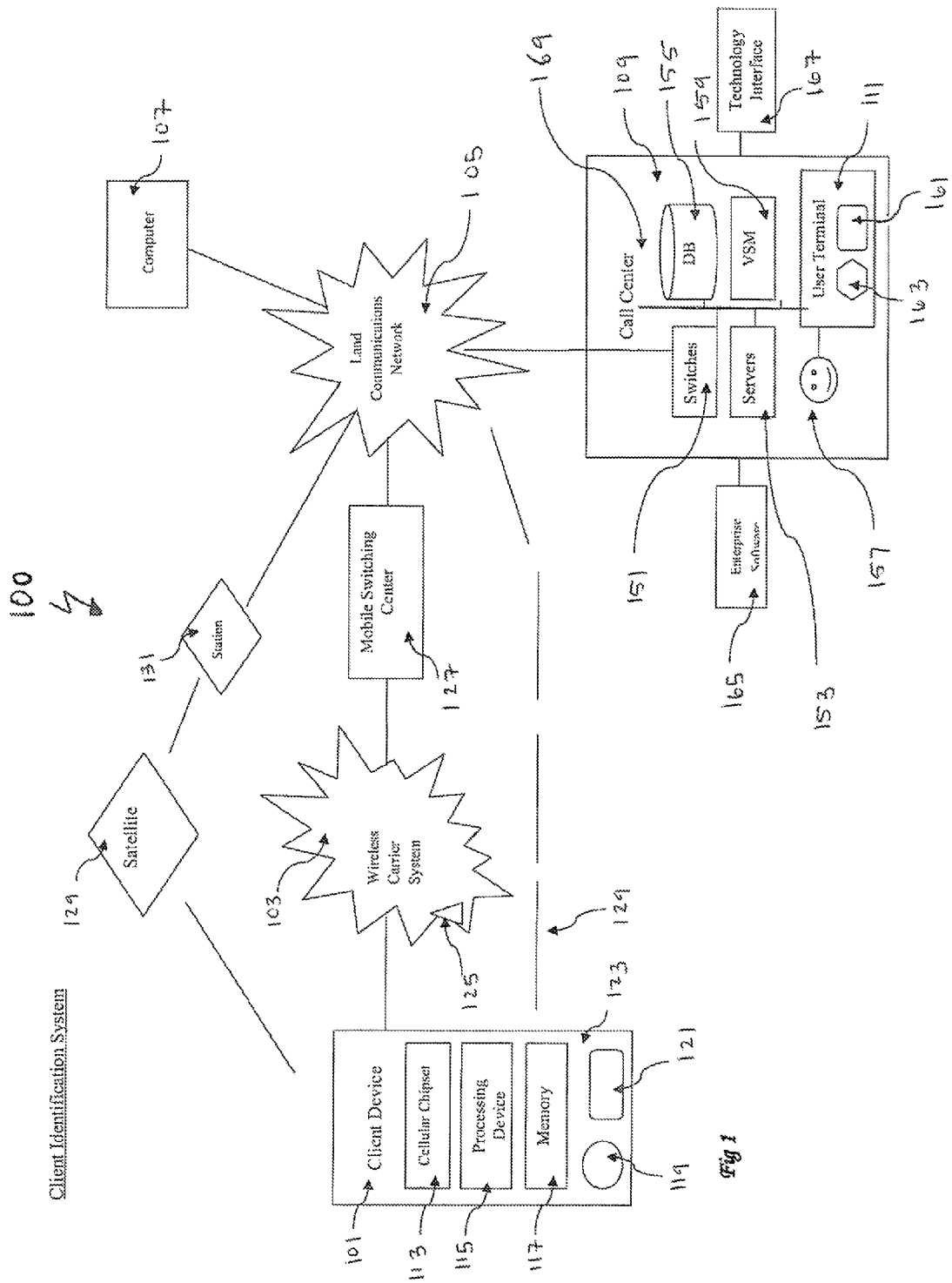
FIG. 1 illustrates a diagram of an exemplary embodiment of the present invention depicting the client identification system using video conferencing technology.

The following is a detailed description of the exemplary embodiments of the present system and process for client identification system using video conferencing technology. However, the present invention is in no way intended to be limited to the embodiments discussed below or shown in the drawings. Rather, the description and drawings are merely illustrative of the exemplary and presently preferred embodiments of the invention.

Client Identification System

The present invention relates to a system for enabling business transactions using video conferencing technology to verify client identification for security purposes. More specifically, the present invention consists of a client device capable of capturing and transmitting real-time images of the client to the user terminal and capable of communicating with the user terminal in real-time, an online network connecting the client to the user terminal, and a user terminal capable of displaying the client's image and communicating with the client in real-time.

FIG. 1 illustrates an embodiment of the present invention, where there is shown an exemplary operating environment that comprises a client identification system 100, that can be used to implement the processing method disclosed herein. Client identifications system 100 generally includes a client device 101, one or more wireless carrier systems 103, a land communications network 105, a computer 107, a call center 109, and a user terminal 111. It should be understood that the disclosed method can be used with any number of different systems and is not specifically limited to the operating environment shown here. The features not discussed in detail, such as, architecture, construction, setup, and operation of the system and its individual components are generally well known in the art. The following paragraphs simply provide a brief overview of one such exemplary system; however, other systems not shown here could employ the disclosed method as well.

Aspects of the present invention may be implemented in various configurations which are well known to those practicing in the art. As an example, in one embodiment the client device 101 may be implemented as a desktop personal computer, stand alone computer, workstation computer, mobile computer, portable computing device, personal digital assistant (PDA) device, cellular telephone, digital audio or video playback device, or any other similar type of computing device. Client device 101 may include a video camera 119 and a voice transmitting and receiving device 121 such as a microphone and audio system in one unit. In an alternate embodiment, the client device may be implemented in a plurality of units such as a separate video camera device 119 and a separate voice transmitting and receiving device 121 that is connected or networked to the client device. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Client device 101 enables wireless voice and/or data communication over wireless carrier system 103 and via wireless networking so that client device 101 can communicate with the call center 109. In one embodiment, client device 101 uses radio transmissions to establish a communications channel (a voice channel and a data channel) with wireless carrier system 103 so that voice and data transmissions can be sent and received over the communications channel. Data can be sent over a data connection, such as via packet data transmission over a data channel, or via a voice channel using techniques well known in the art. Client device 101 can utilize a single call over a voice channel and switch as needed between voice and data transmission over the voice channel, and this can be done using techniques known to those skilled in the art.

According to one embodiment, client device 101 utilizes cellular communication according to either GSM or CDMA standards and thus includes a standard cellular chipset 113 for voice communications like hands-free calling, a wireless modem 123 for data transmission, an electronic processing device 115, one or more digital memory devices 117, and a dual antenna (not shown). It should be appreciated that modem 123 can either be implemented through software that is stored in client device 101 and is executed by processor 115, or, as mentioned above, it can be a separate hardware component located internal or external to client device 101. Modem 123 can operate using any number of different standards or protocols such as EVDO, CDMA, GPRS, and EDGE.

Electronic processing device 115 can be any type of device capable of processing electronic instructions including microprocessors, microcontrollers, host processors, controllers, vehicle communication processors, and application specific integrated circuits (ASICs), to name a few. It can be a dedicated processor 115, used only for client device 101 or it can be shared with other systems. Processor 115 executes various types of digitally-stored instructions, such as software or firmware programs stored in memory 117, which enable client device 101 to provide a wide variety of services. For instance, processor 115 can execute programs or process data to carry out at least a part of the processing method discussed herein.

Client device 101 may communicate with call center 109 via a land communications network 105 or a wireless carrier system 103, or a combination of both, and this can be done using techniques known to those skilled in the art. Wireless carrier system 103 is preferably a cellular telephone system that includes a plurality of cell towers (only one shown) 125, one or more mobile switching centers (MSCs) 127, as well as any other networking components required to connect wireless carrier system 103 with land network 105. Each cell tower 125 includes sending and receiving antennas and a base station, with the base stations from different cell towers being connected to the MSC 127 either directly or via intermediary equipment such as a base station controller. Wireless carrier system 103 can implement any suitable communications technology, including for example, analog technologies such as AMPS, or the newer digital technologies such as CDMA (e.g., CDMA2000) or GSM/GPRS. As will be appreciated by those skilled in the art, various cell tower 125/base station/MSC arrangements are possible and could be used with wireless system 103. For instance, the base station and cell tower 125 could be co-located at the same site or they could be remotely located from one another, each base station could be responsible for a single cell tower 125 or a single base station could service various cell towers 125, and various base stations could be coupled to a single MSC, to name but a few of the possible arrangements.

Apart from using wireless carrier system 103, a different wireless carrier system in the form of satellite communication can be used to provide bi-directional communication with client device 101. This can be done using one or more communication satellites 129 and an uplink/downlink transmitting station 131. Bi-directional communication can be, for example, satellite telephony services using satellite 129 to relay telephone communications between the client device 101 and station 131. If used, this satellite telephony can be utilized either in addition to or in lieu of wireless carrier system 103.

Land network 105 may be a conventional land-based telecommunications network that is connected to one or more landline telephones and connects wireless carrier system 103 to call center 109. For example, land network may include a public switched telephone network (PSTN) such as that used to provide hardwired telephony, packet-switched data communications, and the Internet infrastructure. One or more segments of land network could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 109 need not be connected via land network 105, but could include wireless telephony equipment so that it can communicate directly with a wireless network, such as wireless carrier system 103.

Computer 107 can be one of a number of computers accessible via a private or public network such as the Internet. Each such computer 107 can be used for one or more purposes, such as a web server accessible by the client device 101 and wireless carrier 103. Other such accessible computers 107, can be, for example: a service center computer where accounting information and other transaction data can be uploaded/downloaded from the client device 101; or a third party repository to or from which fraudsters identification or other information is provided, whether by communicating with the client device 101 or call center 109, or both. A computer 107 can also be used for providing Internet connectivity such as DNS services or as a network address server that uses DHCP or other suitable protocol to assign an IP address to client device 101.

Call center 109 is designed to provide client device 101 with a number of different system back-end functions such as the ability to store the client's information, such as his/her photo identification information, passport information, social security information, biometrics or personal information or description, such as hair color, eye color, approximate weight, any facial or body markings, etc., to assist in the verification of the client, and according to the exemplary embodiment shown here, generally includes one or more switches 151, servers 153, databases 155, live advisors 157, as well as an automated voice response system (VRS) (159), or Voice System Module (VSM) 159 (used interchangeably), all of which are known in the art. These various call center 109 components are preferably coupled to one another via a wired or wireless local area network 169. Switch 151, which can be a private branch exchange (PBX) switch, routes incoming signals so that voice transmissions are usually sent to either the live advisor 157 by regular phone or to the VRS 159 using VoIP (Voice over Internet Protocol). The live advisor 157 phone can also use VoIP. VoIP and other data communication through switch 151 is implemented via a modem (not shown) connected between the switch and network. Data transmissions are passed via the modem to server 153 and/or database 155. Database 155 can store account information such as subscriber authentication information, and other similar information listed above. Data transmissions may also be conducted by wireless systems, such as 802.11x, GPRS (General Packet Radio Service), and the like. Although the illustrated embodiment has been described as it would be used in conjunction with a manned call center 109 using live advisor 157, it will be appreciated that call center 109 can instead utilize VRS 159 as an automated advisor or, a combination of VRS 159 and the live advisor 109 can be used.

As a further example, each live advisor 109 operates a user terminal 111 which may be implemented as a desktop personal computer, stand alone computer, workstation computer, mobile computer, portable computing device, personal digital assistant (PDA) device, cellular telephone, digital audio or video playback device, or any other similar type of computing device. User terminal 111 may include a display screen 161 and a voice transmitting and receiving device 163 in one unit. In an alternate embodiment, the user terminal may be implemented in a plurality of units such as a separate display screen 161 and a separate voice transmitting and receiving device 163 that is linked or networked to user terminal 111. As a further example, user terminal 111 may include similar components, features, and capabilities as those described above with respect to client device 101 (i.e., enablement of wireless voice and/or data communication over wireless carrier system and via wireless networking, utilization of cellular communication, utilization of a processor, communication via a land communications network, satellite communication, etc.) Call center 109 may employ the use of enterprise software 165 and various technology interfaces 167 that enable the user terminal to communicate with client device 101, and perform authentication measures as disclosed herein. Enterprise software 165 and technology interfaces 167 are generally well known to those skilled in the art.

Figure 2:
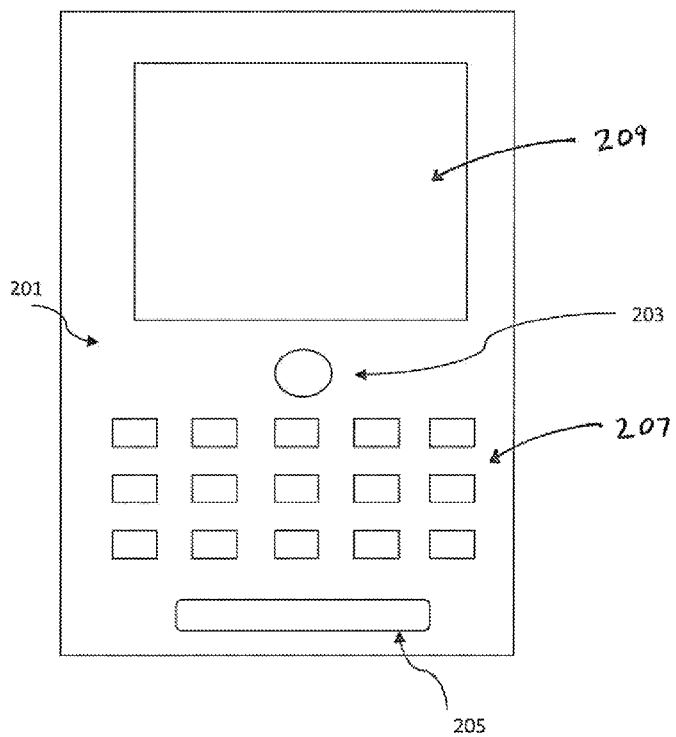
FIG. 2 illustrates a diagram of an exemplary embodiment of the present invention that shows a client device.

FIG. 2 illustrates an exemplary embodiment of the present invention that shows a client device 201. Client device 201 includes a video camera 203 and a voice transmitting and receiving device 205 such as a microphone and audio system in one unit. The client device 201, can also include a data input/retrieval feature 207, such as, a key pad, key board, button, touch screen, to name a few, and a display device 209.

Figure 3:
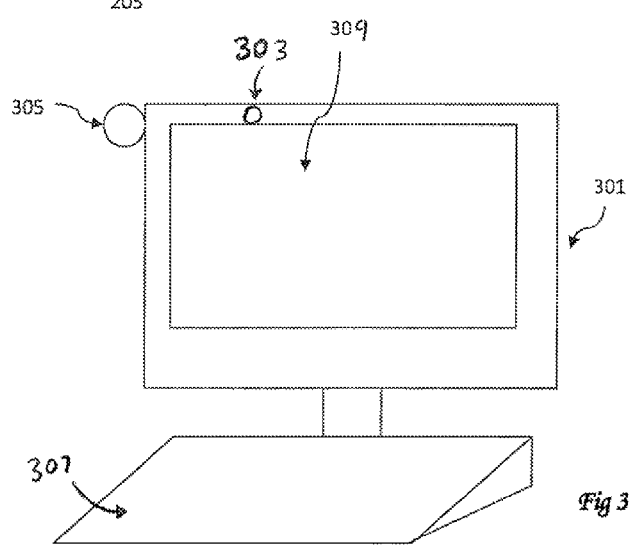
FIG. 3 illustrates a diagram of an exemplary embodiment of the present invention that shows a user terminal.

FIG. 3 illustrates a diagram of an exemplary embodiment of the present invention that shows a user terminal 301. User terminal 301 implements a plurality of units such as a separate display screen 309 and a separate voice transmitting and receiving device 305. The user terminal 301, can also have at least one video camera 303, and can also include a data input/retrieval feature 307, such as, a key pad, key board, button, touch screen, to name a few.

Aspects of the present invention may be implemented on one or more computers executing software instructions. According to one embodiment of the present invention, server and client computer systems transmit and receive data over a computer network or a fiber or copper-based telecommunications network. The steps accessing, downloading, and manipulating the data, as well as other aspects of the present invention are implemented by central processing units (CPU) in the server and client computers executing sequences of instructions stored in a memory. The memory may be random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one of more other computer systems over a network connection.

For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform. Aspects of the present invention can be used in a distributed electronic commerce application that included a client/server network system that links one or more server computers to one or more client computers. The client and server computers may be implemented as desktop personal computers, workstation computers, mobile computers, portable computing devices, personal digital assistant (PDA) devices, cellular telephones, digital audio or video playback devices, or any other similar type of computing device. For purposes of the following description, the terms "computer network" and "online" may be used interchangeably and do not imply a particular network embodiment or topography. In general, any type of network (e.g., LAN, WAN, or Internet) may be used to implement the online or computer networked implementation of the software.

Actual Use of the Client Identification System

Figure 4:
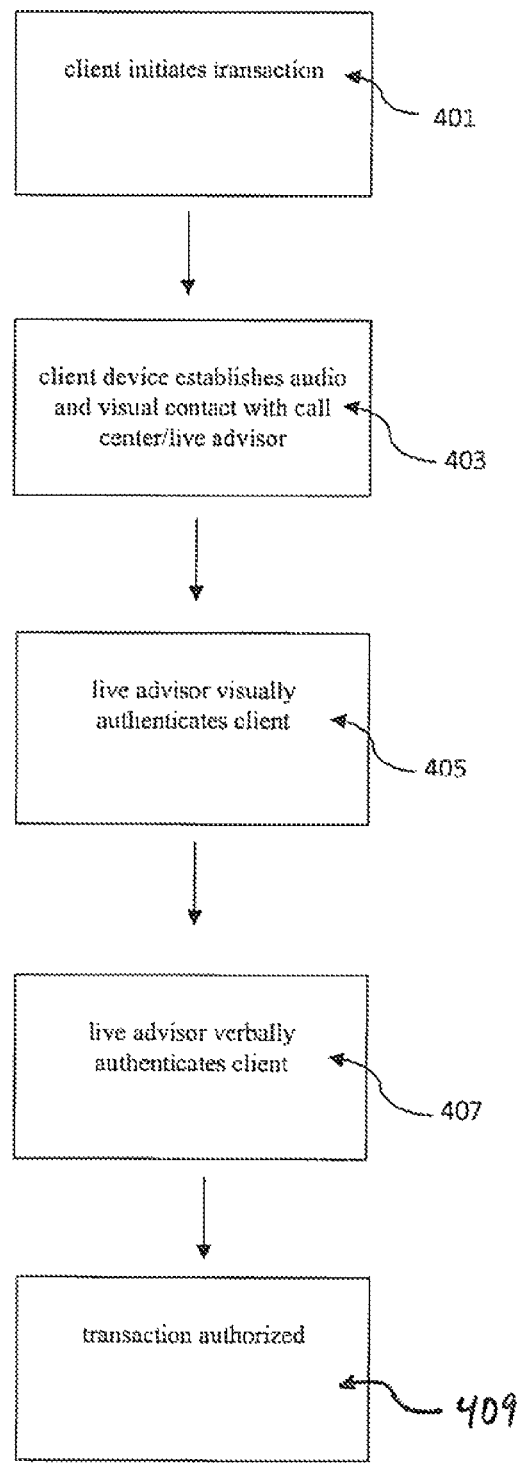
FIG. 4 illustrates a flowchart of an exemplary embodiment of the present invention depiction the major steps of the processing method.

The Client Identification System 100 is easy to use. The client identification system enables financial transactions to take place without the need for the client to go to a branch or dedicated office. Turning now to FIG. 4, there is shown of an exemplary embodiment of the present invention depiction some of the steps the processing method. For example, in one embodiment, if the client wishes to transfer a very large amount of money from one bank account to another bank account, the client would connect with call center 109 using client device 101. The client would use video camera 119 associated with client device 101 and speak into the voice transmitting and receiving device 121 to communicate with live advisor 157 and initiate the transaction 401. At call center 109, live advisor 157 would operate his or her user terminal 111. User terminal 111 also has a display device 161, that would stream the live image of the client and a voice transmitting and receiving device so that live advisor 157 could communicate with the client 403. Once an acceptable connection is established 403, live advisor 157 can begin to authenticate the identity of the client before permitting the financial transaction in question.

In the exemplary embodiment described above, live advisor 157 can compare and visually authenticate the live video image of the client 405 with an image and other visual specifics (client data) of the client at the disposal of the live advisor 157. For example, the image and other visual specifics may be in the form of a government issued identification card, passport, or other listed information or biometrics or personal information or description such as eye color, hair color, body markings, etc. In one embodiment, this information can be stored in a database 155 on or offsite and can be made accessible to the live advisor's 157 user terminal 111 through various means well known to those skilled in the art. Once a visual identification and comparison is complete, live advisor 157 may begin to communicate with the client 407 to complete the authentication process.

In the exemplary embodiment described above, live advisor 157 is not limited to static or confidential one or two factor themes such as social security number, mother's maiden name, previous addresses, country of birth, elementary schools, or other similar biographical or static information as previously discussed. Live advisor 157 can ask non-confidential information of the client to determine a live connection. For example, live advisor 157 can make "small talk," or ask the client about the weather or the clothes he is wearing, or the environment he is in now. Alternatively, Live advisor 157 can ask confidential or non-confidential information in the form of preferences or likes and dislikes of the client. For example, Live advisor 157 can ask a question (or a question can be generated by the system and provided to Live advisor 157 in a manner well known to those skilled in the art) such as "Do you like pizza?" The responses given by a client can be a "yes" or "no" answer or alternatively can be a response based on a continuum, or scale such as 1 to 5 (1 being strongly like and 5 being strongly dislike). In one embodiment these preferences can be stored in database 155 on or offsite and can be made accessible (or provided) to the live advisor's 157 user terminal 111 through various means well known to those skilled in the art.

Once a client's preferences are stored and made accessible to live advisor 157, an infinite or endless number of questions may asked based on the client's preferences. The list or descriptions of non confidential questions or subject matter that may be discussed is endless, and well known to those practicing in the art. At least one purpose of these questions are to confirm that the client is truly the client and that a video loop or other fraudulent image is not attempting to perpetrate a financial transaction. These questions also serve the purpose of being a "one time question" (OTQ) that has a "one time answer" (OTA) that act as a "one time password" (OTP). An OTP is a password that is only valid for a single login session or transaction. OTPs avoid a number of shortcomings that are associated with traditional (static) passwords. The most important shortcoming that is addressed by OTPs is that, in contrast to static passwords, they are not vulnerable to replay attacks. This means that, if a potential intruder manages to record an OTP that was already used to log into a service or to conduct a transaction, he will not be able to abuse it since it will be no longer valid. This will prevent fraudsters reusing the OTQ to setup a phishing scam and/or directly using the OTA (specific answer) again.

In the exemplary embodiment described above, live advisor 157 in addition to conducting small talk or asking non-confidential information, may also ask static questions to further confirm the identity of the client. Static questions that the live advisor may ask include, but are not limited to, social security number, home address, driver's license number, birth date, mother's maiden name, father's first name, favorite sport, school name, etc.

In the exemplary embodiment described above, once the client's identification is authenticated, live advisor 157 can permit the financial transaction to take place 409.

In another example, if live advisor 157 were to "catch" an imposter or fraudster, the image of the fraudster and other fraudster data can easily be stored in a database, such as the phone number, IP address, or other digital signatures, and can be reported to the proper law enforcement authorities. The image can also be stored in an on or offsite database to easily detect and spoil future attempts by the fraudster. Of course, although the illustrated embodiment has been described as it would be used in conjunction with a manned call center 109 using live advisor 157, it will be appreciated that the call center can instead utilize VRS 159 as an automated advisor or, a combination of VRS 159 and the live advisor 157 can be used.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A system for identifying a client, comprising:
a client device having a video camera and a voice transmitting and receiving device capable of transmitting a client's image and voice via a communication carrier system and a communications network to a user terminal, whereby the user terminal permits an authentication of the client's image and voice in real time;
wherein, real-time dialogue of a non-confidential nature between the client and a live person at the user terminal acts to authenticate the client, wherein said real-time dialogue authentication does not rely on previously stored client responses, and wherein, said real-time dialogue authentication comprises of small talk.

2. The system of claim 1, wherein the communication carrier system is selected from a group consisting of a cellular telephone system, a wireless carrier system, and a satellite communication system.

3. The system of claim 1, wherein the user terminal has a voice transmitting and receiving device.

4. The system of claim 1, wherein the user terminal is operated by a live advisor.

5. The system of claim 1, wherein the client's image and voice is authenticated by comparing it with at least one client's identification data.

6. The system of claim 5, wherein the at least one client's identification data is stored in a database.

7. The system of claim 1, wherein the transmission is further authenticated with static information.

8. A method of identifying a client, comprising the steps of:
using a client device having a video camera and voice transmitting and receiving device to initiate an authentication of a client's identity;
transmitting a client's image and voice over a communication carrier system and a communications network to a user terminal; and
authenticating the client's image and voice in real time;
wherein, real-time dialogue of a non-confidential nature between the client and a live person at the user terminal acts to authenticate the client, wherein said real-time dialogue authentication does not rely on previously stored client responses, and wherein, said real-time dialogue authentication comprises of small talk.

9. The method of claim 8, further comprising the step of displaying the client's image and voice on the user terminal's voice transmitting and receiving device.

10. The method of claim 8, further comprising the step of authenticating the client's image by comparing the client's image to client data stored by the user terminal.

11. The method of claim 8, further comprising the step of authenticating the client's voice by comparing the client's voice to client data stored by the user terminal.

12. The method of claim 8, further comprising the step of authenticating the transmission by asking static information.

13. A method of identifying a fraudster, comprising the steps of:
using a client device having a video camera and voice transmitting and receiving device to initiate an authentication of a client's identity;
transmitting the fraudster's image and voice over a communication carrier system and a communications network to a user terminal;
comparing the fraudster's image and voice to client data; and
storing the fraudster data;
wherein, real-time dialogue of a non-confidential nature between the fraudster and a live person at the user terminal acts to authenticate the fraudster, wherein said dialogue authentication does not rely on previously stored client responses, and wherein, said real-time dialogue authentication comprises of small talk.

14. The method of claim 13, further comprising the step of displaying the fraudster's image and voice on the user terminal's voice transmitting and receiving device.

15. The method of claim 13, further comprising the step of comparing the fraudster's image to client data stored by the user terminal.

16. The method of claim 13, further comprising the step of comparing the fraudster's voice to client data stored by the user terminal.

17. The method of claim 13, further comprising the step of comparing the answer of static information from the fraudster to client data.

18. The system of claim 1, wherein the dialogue includes real-time discussion of non-confidential subject matter selected from the group consisting of weather, the client, the client's surroundings and environment, and the likes and dislikes of the client.

19. The method of claim 8, wherein the dialogue includes real-time discussion of non-confidential subject matter selected from the group consisting of the weather, the client, the client's surroundings and environment, and the likes and dislikes of the client.

20. The method of claim 13, wherein the dialogue includes real-time discussion of non-confidential subject matter selected from the group consisting of the weather, the client, the client's surroundings and environment, and the likes and dislikes of the client.

* * * * *